United States Patent Office 2,936,020
Patented May 10, 1960

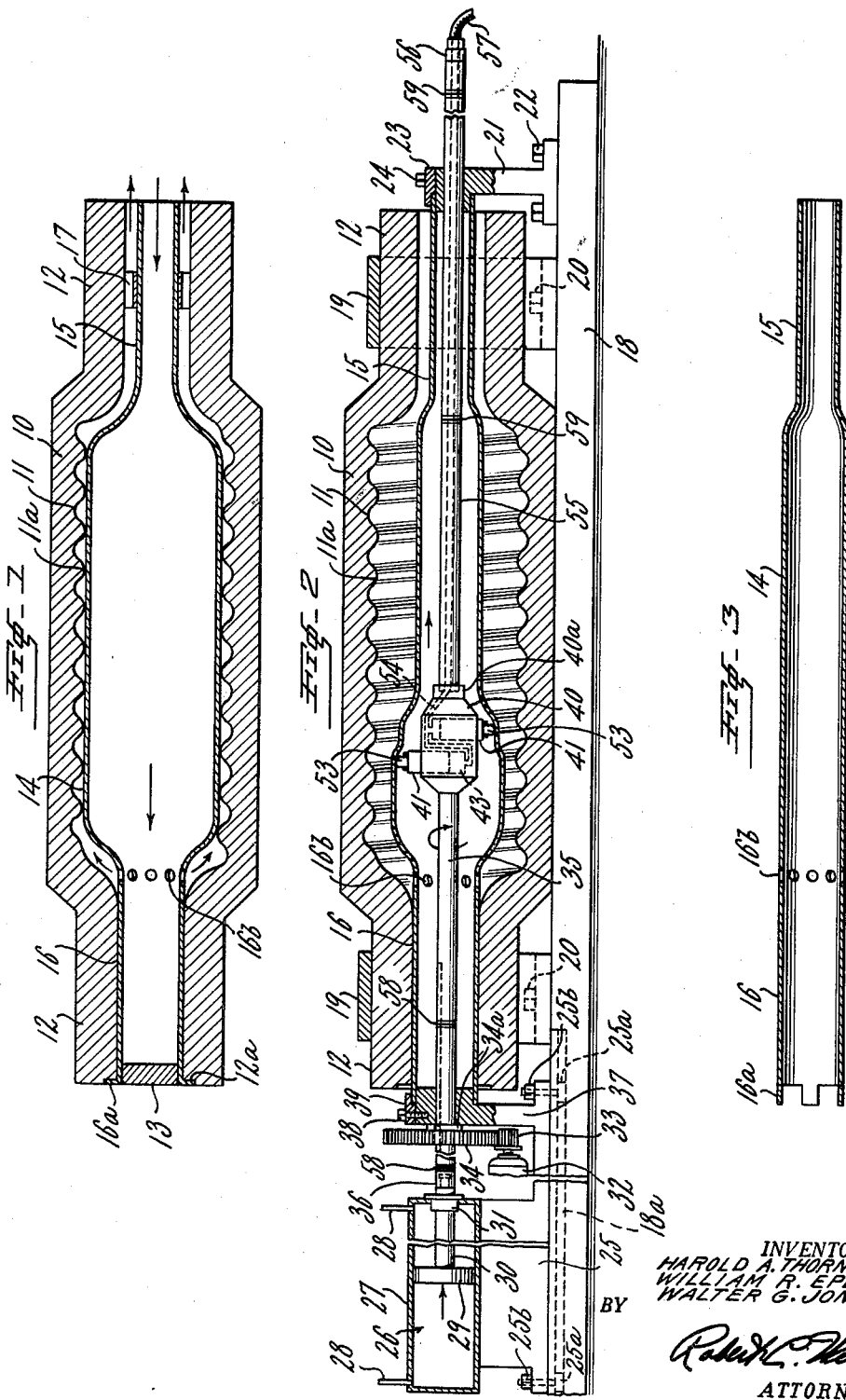

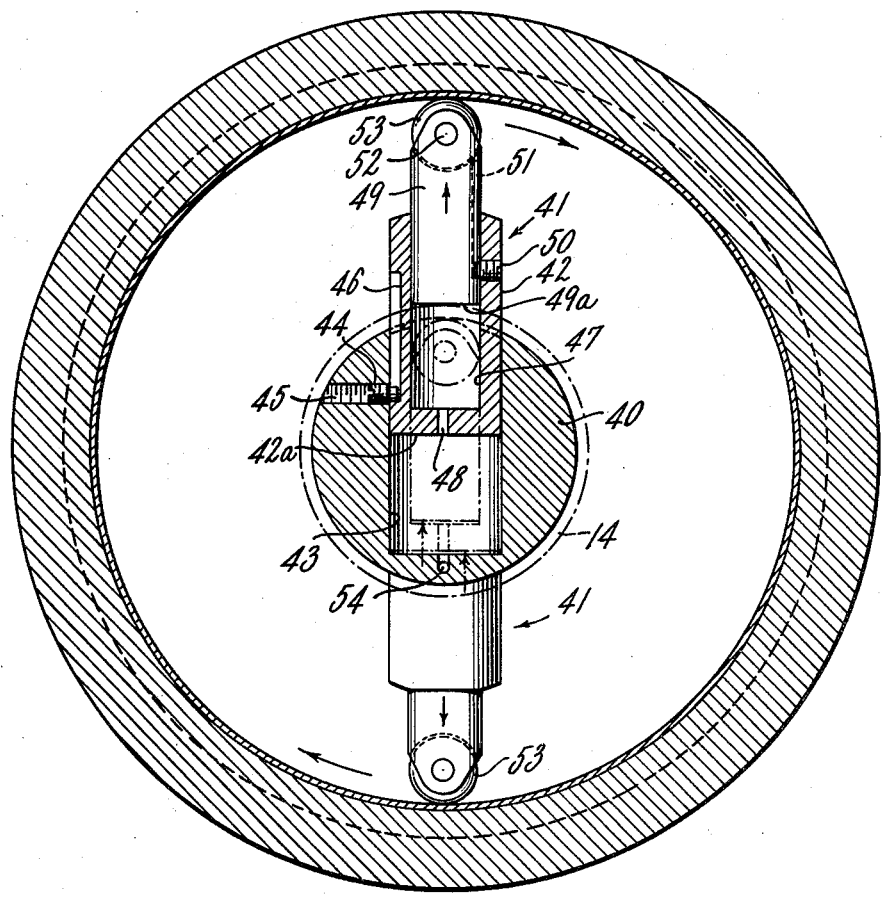

2,936,020

APPARATUS FOR EXPANDING TUBULAR BODIES

Harold A. Thornburg, Hillsdale, N.J., and William R. Epes, Yonkers, and Walter G. Jones, New York, N.Y., assignors to United States Rubber Company, New York, N.Y., a corporation of New Jersey Application July 7, 1955, Serial No. 520,536

7 Claims. (Cl. 153—81)

This invention relates to apparatus for expanding tubular bodies and more particularly to an apparatus for expanding a heat conductive tube in a roll for working rubber and like materials and for other purposes, such as is described and claimed in copending application Serial Number 520,434, filed July 7, 1955.

One of the most difficult problems to overcome in equipping such rolls with a heat conductive tube is to assemble the tube within the roll as an integral part thereof. Traditionally, these rolls have been and are being made of chilled iron, and have an enlarged central portion for working the material as well as reduced trunnions at each end which are rotatably supported in bearings. Likewise, such rolls are hollow for the passage of a heat transfer medium, but the central cavity is considerably larger than those in the trunnions. Thus, any heat conductive tube must be small enough in diameter to pass through the trunnion cavities. However, in order to obtain the optional heat transfer between the fluid flowing in the tube and that in contact with the interior wall of the central portion of the roll, it is necessary that the tube be expanded into close proximity or contact with the aforementioned interior roll wall. Consequently, the expanding tool must be of such a nature that it can be easily inserted within and withdrawn from an unexpanded portion of the tube, and yet be capable of expanding the tube to the prescribed diameter.

Therefore, the primary object of this invention is to provide an apparatus which is capable of expanding a heat conductive tube to a prescribed diameter in order to form a passage for the flow of a heat transfer medium between the tube and the interior of a roll, and which apparatus is so constructed that the expanding tool forming a part thereof can be readily inserted within and withdrawn from an unexpanded portion of the tube.

An important object of the invention is to provide an apparatus for rigidly clamping the heat conductive tube prior to and during the expanding operation, and in the particular embodiment illustrated, to maintain the tube within the roll in a predetermined relationship thereto, while the tube is being expanded.

Anoher important object of the invention is to provide an apparatus so constructed that the expanding tool comprising a part thereof may be simultaneously reciprocated and rotated for expanding the tube to a desired diameter along a predetermined length thereof.

Other objects and advantages of the present invention will become apparent from a consideration of the following specification and claims when read in conjunction with the accompanying drawings, wherein:

Fig. 1 is a longitudinal sectional view illustrating a roll and heat conductive tube disposed therein;

Fig. 2 is a longitudinal sectional view showing the apparatus comprising the invention and how it operates to properly position and form the heat conductive tube within the roll of Fig. 1;

Fig. 3 is a longitudinal sectional view of the heat conductive tube of Fig. 1 prior to positioning the same within the roll, and Fig. 4 is an enlarged cross sectional view showing a part of the apparatus of Fig. 2 in fully extended position.

Referring to Fig. 1, there is shown a roll 10 the construction and use of which are fully described in the aforementioned copending application. Basically, roll 10 has hollow trunnions 12 at each end, one of which is closed by a conventional plug 13, and may be made of any suitable material, preferably a ferrous metal such as chilled iron. As is apparent, roll 10 is hollow and its interior surface 11 forms an enlarged central cavity therein. Surface 11 also has a helical rib 11a which has an internal diameter of approximately 2½ times the internal diameters of trunnions 12. Within the cavity of roll 10 there is disposed a heat conductive tube 14 which is preferably constructed of a relatively thin walled, highly conductive metal such as aluminum or copper, for a higher rate of heat transmission. Tube 14 is provided with an inlet end 15 and an outlet end 16, each of which extends into trunnions 12. Inlet end 15 is secured in one of the trunnions 12 by means of a conventional spider 17 extending therebetween. Spider 17 may be rigidly attached to inlet 15 and trunnion 12 in any suitable manner, preferably by welding. Outlet end 16 is secured in the other of trunnions 12 in any suitable manner, preferably by means of a press fit therebetween. If desired, outlet end 16 may be additionally secured in trunnion 12 by providing the former with outwardly extending flange portions 16a which are seated in corresponding recesses 12a in the latter, and welded thereto. Plug 13 may be made so as to fit tightly within outlet end 16 and if desired, may be welded thereto. The central portion of tube 14 is expanded in the cavity of the roll 10, whereby the exterior surface of the tube 14 abuts the rib 11a to form a helical passage therebetween.

In operation, the roll 10 and tube 14 rotate together, and as indicated by the arrows in Fig. 1, the heat transfer medium flows into the tube 14 through the opening of inlet end 15 in one direction; then the medium flows out from the numerous apertures 16b in outlet end 16, through the helical passage formed by the rib 11a and the central portion of the tube 14, around inlet end 15 in trunnion 12, and out of the roll, in the opposite or counter direction.

Referring now to Fig. 2, the apparatus comprising the present invention will now be described. A solid base 18 is provided to support roll 10 which is secured thereon by clamps 19 tightly engaging trunnions 12. Clamps 19 are in turn fastened to base 18 by any suitable means such as bolts 20. Inlet end 15 of tube 14 extends beyond trunnion 12 and fits snugly over a cylindrical hub portion formed on stanchion 21, which is firmly secured to base 18 by any suitable means such as bolts 22. Inlet end 15 is immovably secured to stanchion 21 by means of one or more clamps 23 and bolts 24.

The mechanism for clamping outlet end 16 and expanding the central portion of tube 14 comprises a bearing block 25 adjustable longitudinally of base 18 by means of bolts 25a having a square head extending into and slidable in an inverted T slot 18a. The bolts 25a extend through feet on the block 25 and are provided with nuts 25b. At one end of block 25 there is a double acting hydraulic motor 26 comprising a cylinder 27 having ports 28 and a piston 29. Integrally attached to piston 29 is a piston rod 30 which reciprocates through a conventional packing 31 in one end of cylinder 27. Adjacent the other end of bearing block 25 there is mounted a conventional electric motor 32 having a flanged pinion 33 which drivingly engages a gear 34 slidably mounted on rod 35 by means of a conventional spline connection. Rod 35 is connected to piston rod 30 by any suitable coupling such as 36, permitting relative rotation therebetween. At the other end of bearing block 25 is a stanchion 37 which is similar to stanchion 21. Stanchion 37 is provided with a hub portion around which outlet end 16 of tube 14 is secured by one or more bolts 38 and clamps 39, and through which shaft 35 rotates and reciprocates. Gear 34 may be provided with a small hub or washer 34a to space the gear from stanchion 37, and together with the flanged pinion 33, hub or washer 34a will permit gear 34 to rotate rod 35 but will prevent the gear from reciprocating therewith.

At the end of rod 35 remote from piston rod 30, is the expanding tool or head 40 in which are disposed a pair of diametrically opposed and axially offset, telescoping arms 41. Since the construction and operation of each arm is identical, a description of one will suffice for both. Referring now to Fig. 4, each arm 41 comprises an outer piston 42 reciprocable in bore 43 of head 40. The movement of outer piston 42 is limited by means of a stop screw 44 threaded into a bore 45 in head 40 and slidably engaging a slot 46 in outer piston 42. Outer piston 42 is also provided with a large cavity 47 in which inner piston 49 reciprocates, and a small aperture 48 for the flow of hydraulic fluid into cavity 47. The movement of inner piston 49 with respect to outer piston 42 is limited by a stop screw 50 threaded into outer piston 42 and slidably engaging a slot 51 in inner piston 49. Inner piston 49 is bifurcated at its outer end in which is mounted a shaft 52 upon which a roller 53 rotates.

Referring to Fig. 2, the head 40 is provided with a passageway 54 having openings into each of bores 43 and the end of head 40 opposite rod 35 is provided with a boss 40a having a hollow rod or shaft 55 threaded therein. Hollow shaft 55 freely extends through the hub portion 21 and is rotatably coupled at 56 to a flexible coupling 57 which is in turn connected to a suitable source of hydraulic fluid supply (not shown).

The manner in which tube 14 is fabricated and positioned within roll 10 will now be described. As seen in Fig. 3, tube 14, before being inserted in roll 10, is formed with a smaller tubular portion which serves as inlet end 15, and a larger portion, one end of which comprises outlet end 16 having flange portions 16a and apertures 16b formed therein. As stated above, tube 14 is preferably formed of relatively thin-walled, highly conductive metal such as aluminum or copper, and it may be given the shape of Fig. 3 by a conventional extrusion or drawing process. The apertures 16b are either drilled or punched before tube 14 is positioned within roll 10, and flange portions 16a are preferably formed by cutting out a series of circumferentially spaced, axially extending slots before tube 14 is located within roll 10, but this may be done after the positioning step, if so desired.

After roll 10 is clamped in the position shown in Fig. 2 by the clamps 19, tube 14 is inserted within the roll preferably from right to left with outlet end 16 entering the roll first. While tube 14 is being initially positioned within roll 10, bearing block 25 is located far enough away from the left end of roll 10 and piston 29 is fully retracted so that the expanding tool or head 40 is disposed completely outside roll 10. The hollow shaft 55 is preferably passed through roll 10 and tube 14 in the same direction as the tube, and is threaded into head 40 at 40a and coupled at 56 to a flexible coupling 57. Inlet end 15 is now clamped on stanchion 21 and bearing block 25 is slid to the position shown in Fig. 2. At this time the telescoping arms 41 of expanding tool or head 40 are permitted to fully retract and the head will therefore slide within outlet end 16 of tube 14. Flange portions 16a of outlet end 16 are then clamped over stanchion 37 and bearing block 25 is firmly secured to base 18 by means of bolts 25a and nuts 25b. The operation of the hydraulic motor 26 and electric motor 32 are controlled by a suitable switch or switches (not shown); the head 40 being reciprocated by piston 29 through piston rod 30 and extension rod 35, and rotated by pinion 33 through gear 34 and rod 35. When head 40 extends far enough into roll 10 so that the expanding operation may begin, a suitable valve (not shown) connected to flexible coupling 57 is opened, whereby hydraulic fluid from a suitable source of supply (not shown) passes under pressure through hollow shaft 55, passage 54 in head 40 and into bores 43.

Referring now to Fig. 4 particularly, the incoming hydraulic fluid exerts pressure against the bottom face 42a of outer piston 42, and passing through aperture 48, acts against bottom face 49a of inner piston 49, as shown by the dotted arrows. Outer piston 42 will move outwardly first because the surface area of its bottom face 42a is greater than that of piston 49. When stop screw 44 engages the bottom of slot 46, outer piston 42 reaches its outer limit of movement. At this point, the hydraulic fluid acts against bottom face 49a forcing inner piston 49 outwardly until the stop screw 50 engages the bottom of slot 51, limiting further movement. It will be noted that both outer piston 42 and inner piston 49 are designed so that they are in their outermost positions when the central portion of tube 14 is expanded approximately 2½ times its original diameter to firmly abut against rib 11a, and thus there is no possibility of the tube being over-expanded into the helical passage formed between the turns of helical rib 11a.

Obviously, pistons 42 and 49 comprising the telescoping arms 41 of head 40 will be expanded gradually by progressively increasing the fluid pressure as the head rotates relative to tube 14 about the axis thereof (in the direction of the arrows) and simultaneously reciprocates within roll 10 and relative to tube 14 along the axis thereof, until the central portion of tube 14 is radially expanded from its dot-dash line position to its solid line position (Fig. 4) with its external surface abutting rib 11a. The longitudinal position of head 40 within roll 10 may be determined by any suitable gauge, but preferably by scored marking such as 58 on rod 35 and/or 59 on rod 55, as shown in Fig. 2, so that the central portion of tube 14 can be expanded to the proper shape without distorting apertures 16b or weakening the tube at the juncture of outlet end 16 and the central portion of tube 14.

At the completion of the expanding operation, the fluid pressure in head 40 is released and pistons 42 and 49, comprising the expandable arms 41, are permitted to retract so that the tool 40 may be withdrawn from the roll 10 through outlet end 16. After the tool or head 40 has passed to the left of apertures 16b the fluid pressure is increased slightly so that the expansible arms will bear against the interior of outlet end 16 and expand the same to a press fit within trunnion 12 as the tool is being retracted. When the head 40 approaches stanchion 37 the fluid pressure in head 40 is released, thereby allowing arms 41 to retract; the switches (not shown) activating hydraulic motor 26 and electric motor 32 are turned off; hollow shaft 55 is disconnected at 56 from flexible coupling 57; the bolts 25a and nuts 25b holding bearing block 25 are loosened, and bolts 38 and clamps 39 are removed from stanchion 37. The bearing block 25 is then slid away from outlet end 16, thereby pulling head 40 along with the bearing block 25 until the head is free of the roll 10. The hollow shaft 55 is detached from boss 40a on head 40 and completely withdrawn from the roll, preferably from left to right as viewed in Fig. 2; inlet end 15 of tube 14 is removed from stanchion 21 and is then supported in trunnion 12 by a spider 17 which may be welded to the trunnion and inlet end 15. If desired, the flange portions 16a of outlet end 16 may now be bent over to fit into recesses 12a and welded therein, and plug 13 may be then pressed into outlet end 16 for welding thereto.

Although the apparatus comprising the invention has been shown and described as applied to expanding a heat conductive tube within a roll, it is to be understood that it may be readily adapted to the expansion of many other types of tubular bodies, which in themselves may or may not be enclosed within an outer member. Similarly, while the apparatus comprising the invention has been shown and described in a preferred form, it is to be understood that various changes and modifications may be made therein by those skilled in the art without departing from the principles of the invention, the scope of which is to be determined by the appended claims.

Having thus described our invention, what we claim and desire to protect by Letters Patent is:

1. An apparatus for expanding a tubular body comprising a pair of spaced stanchions having hub portions around which each end of said tubular body is rigidly secured, rod-like means having a fluid-operated expanding tool thereon and adapted to be inserted into said body between said stanchions, said tool having a pair of diametrically opposed and axially offset telescoping arms, each of which comprises an inner and outer piston reciprocable relative to said tool and to each other for radially expanding said body, first power operated means connected to said rod-like means for reciprocating the same relative to said body along the axis thereof while permitting rotation of said rod-like means, and second power operated means connected to said rod-like means for rotating the same relative to said body about the axis thereof while permitting reciprocation of said rod-like means.

2. An apparatus as in claim 1 wherein said rod-like means comprise a pair of rods rigidly connected at their adjacent ends to said expanding tool, one of said rods being connected at its opposite end to said first and second power operated means, the other of said rods being connected at its opposite end to a source of fluid and being hollow for the passage of said fluid between said tool and said source for operating said arms, and said inner piston in each of said arms having a roller mounted thereon for contact with the interior of said tubular body for radially expanding the same.

3. In an apparatus for expanding a tubular body, a fluid-operated expanding tool which is adapted to be inserted into said body for reciprocation relative to said body along the axis thereof and for rotation relative to said body about the axis thereof, said tool having a plurality of perimetrically spaced telescoping arms, each of which comprises an inner and outer piston reciprocable relative to said tool and to each other for expanding said body.

4. In an apparatus for expanding a tubular body, an expanding tool as in claim 3, wherein said arms are circumferentially spaced and axially offset to expand said body.

5. In an apparatus for expanding a tubular body, an expanding tool as in claim 3, wherein said arms are diametrically opposed and axially offset to radially expand said body.

6. In an apparatus for expanding a tubular body, an expanding tool as in claim 5 wherein said inner piston in each of said arms has a roller mounted thereon for contact with the interior of said tubular body for radially expanding the same.

7. In an apparatus for expanding a tubular body, a fluid-operated expanding tool which is adapted to be inserted into said body for reciprocation relative to said body along the axis thereof and for rotation relative to said body about the axis thereof, said tool having a plurality of perimetrically spaced telescoping arms, each of which includes at least two telescoping concentric pistons reciprocable relative to said tool and to each other for expanding said body.

References Cited in the file of this patent

UNITED STATES PATENTS

| | | |
|---|---|---|
| 789,867 | McCallum | May 16, 1905 |
| 1,078,583 | Johnson | Nov. 11, 1913 |
| 1,419,929 | Jackson | June 20, 1922 |
| 1,525,288 | Gessi | Feb. 3, 1925 |
| 1,536,433 | Hartman | May 5, 1925 |
| 1,596,538 | Ingram | Aug. 17, 1926 |
| 2,575,938 | Brenneke | Nov. 20, 1951 |
| 2,627,891 | Clark | Feb. 10, 1953 |
| 2,638,802 | Froussard | May 19, 1953 |

FOREIGN PATENTS

| | | |
|---|---|---|
| 160,585 | Great Britain | Mar. 31, 1921 |